April 22, 1930.   A. I. ROORDA   1,755,519
VEHICLE TONGUE
Filed June 14, 1927
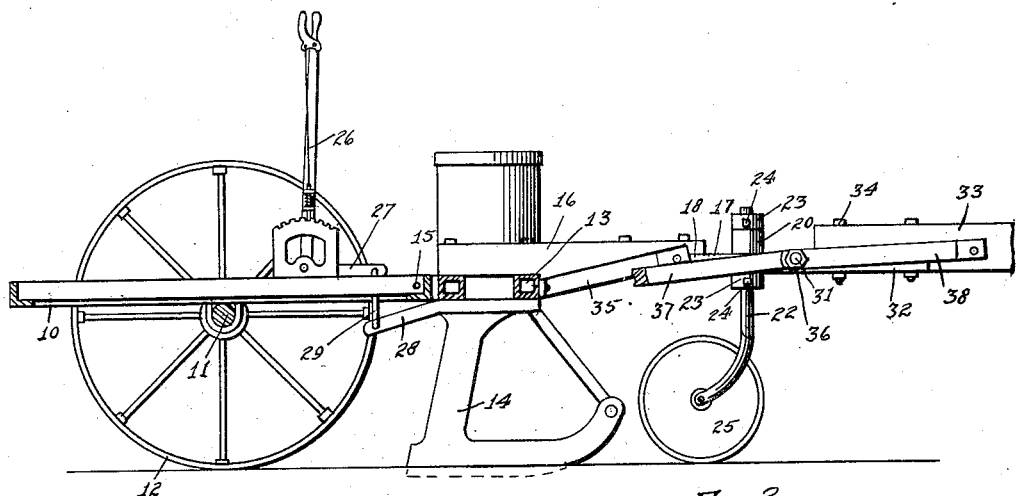
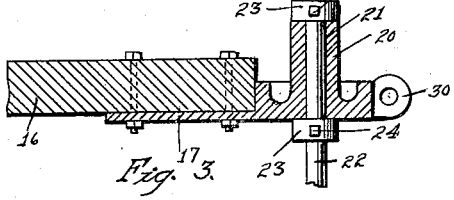
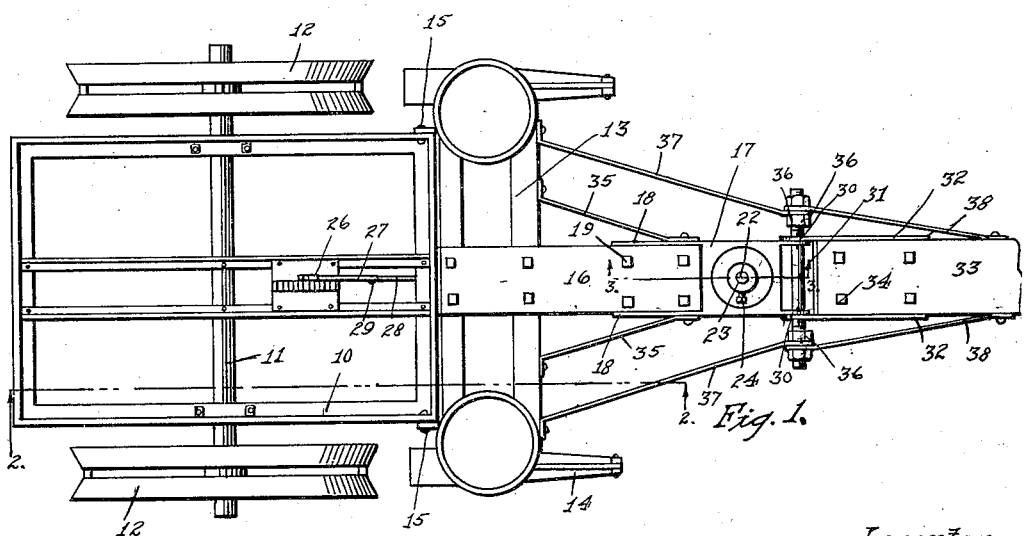
Inventor.
Abraham Roorda
by Onnig & Hague, Attorneys.

Patented Apr. 22, 1930

1,755,519

UNITED STATES PATENT OFFICE

ABRAHAM I. ROORDA, OF LEIGHTON, IOWA

VEHICLE TONGUE

Application filed June 14, 1927. Serial No. 198,780.

This invention relates to improvements in vehicle tongues, and particularly to that type adapted to be used in connection with corn planters.

The runners of the ordinary corn planters are carried by a frame pivotally connected with the main planter frame carried by the wheels, the runner frame being supported rigidly on the rear end of the tongue which is of considerable length, the forward end of the tongue being supported by the neck yoke of the draft animals. The frame members are pivoted together to adjust the depth of the runners by suitable lever mechanism. By this arrangement the runner frame and planter frame become practically a rigid frame, so that the runners are supported between the wheels and the forward end of the tongue. If the planter is operated over a draw, and the wheels of the planter are on one side of the draw and the draft animals on the other side, then it will be seen that the planter runner will be supported entirely above the ground surface.

It is, therefore, the object of my invention to provide improved means for pivotally connecting the planter frame with the planter tongue, to prevent any lateral bending movement of the pivoted portion of the tongue and planter frame.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved planter.

Figure 2 is a detail sectional view taken on the line 2—2 of Figure 1.

Figure 3 is a detail sectional view taken on the line 3—3 of Figure 1.

My improved tongue is designed to be used in connection with a planter and comprises a main frame 10 having a transversely arranged axle 11 carried by covering wheels 12. Pivotally supported to the forward end of the main frame 10 is the runner frame 13 having runners 14. The frames 10 and 13 are pivotally connected by pivots 15. A stub tongue 16 is mounted on top of the central portion of the frame 13. Said tongue member is substantially rectangular in cross section and has its forward end provided with a plate 17, the rear end of which is adapted to fit against the under surface of the tongue 16. The rear end of said plate is provided with upwardly extending flanges 18 designed to engage the side edges of the tongue 16, said plate being secured in position by means of bolts 19. The forward end of the plate 17 is provided with an upwardly extending lug 20 having a vertical opening 21 in which is rotatively mounted a shaft 22. Collars 23 are provided to support the shaft against longitudinal movement, said collars being adjustably mounted by means of set screws 24.

The lower end of the shaft 22 is provided with a single wheel 25 which acts as a caster wheel for supporting the forward end of the tongue 16, and also as a gauge for supporting the runners 14 at a predetermined depth. The depth of said runners is regulated by means of a lever 26 having a forwardly extending arm 27. The frame 13 is provided with a rearwardly extending arm 28 having its rear end supported below the forward end of the arm 27. The ends of said arms are pivotally connected by means of a link 29. By this arrangement it will be seen that if the lever 26 is operated and moved rearwardly, the forward end of the arm 27 will be elevated, causing the rear end of the arm 28 to be elevated, together with the runners 14. The weight of the runner is carried by the wheels 12 and 25.

The forward end of the plate 17 is provided with forwardly extending lugs 30 for supporting a transversely arranged bolt 31, which has each end screw threaded. Said bolt is designed to carry a second plate 32 secured to the rear end of the tongue 33 by suitable bolts 34. The plates 17 and 32, together with the bolt 30, form a hinge for pivotally connecting the tongue members 16 and 33. Braces 35 are provided for bracing the forward end of the stub tongue 16, while the outer ends of the bolt 31 are provided with nuts 36 and brace members 37 and 38, said brace members being mounted between the said nuts. The brace members 37 have their rear ends supported to the outer end of the frame member 13, while the forward end of the brace members 38 are secured to the tongue 33 in the manner clearly illustrated in Figures 1 and 2.

Due to the fact that the guiding of the runners 14 is controlled through the tongue 33, it will be seen that it is necessary to eliminate any lateral bending or play in the pivoted joint of the plates 17 and 32. This is accomplished by the braces 37 and 38. Nuts 36 provide means for alining the tongue 33 with the tongue 16.

Thus it will be seen that I have provided a tongue particularly adapted to be used in connection with corn planters of the type using a tongue truck and provided with means whereby the tongue will be rigidly held against lateral movement relative to the tongue truck, and at the same time permit the free end of the tongue to swing upwardly and downwardly freely about the pivot center.

I claim as my invention:

1. In a device of the class described, a frame member including a stub tongue, a tongue, means for pivotally connecting said tongue to said stub tongue, said means comprising a plate having forwardly extending pivot lugs and an upwardly extending lug having a vertical opening, means for securing said plate to said stub tongue, a second plate having rearwardly extending pivot lugs for coacting with the first said pivot lugs, means for securing said second plate to said tongue, a pivot member extending through said pivot lugs having each of its outer ends provided with a threaded portion, each of the outer ends being provided with a pair of brace members, one set of the corresponding brace members being secured to said tongue and the other corresponding set being secured to said frame member, nuts for adjusting the pivot ends of said brace members laterally.

2. In a device of the class described, a frame member including a stub tongue, a tongue, means for pivotally connecting said tongue to said stub tongue, said means comprising a plate having forwardly extending pivot lugs, means for securing said plate to said stub tongue, a second plate having rearwardly extending pivot lugs for coacting with the first said pivot lugs, means for securing said second plate to said tongue, a pivot member extending through said pivot lugs having each of its outer ends provided with a threaded portion, each of the outer ends being provided with a pair of brace members, one set of the corresponding brace members being secured to said tongue and the other corresponding set being secured to said frame member, and nuts for adjusting the pivot ends of said brace members laterally.

Des Moines, Iowa, April 26, 1927.

ABRAHAM I. ROORDA.